United States Patent [19]

Hartmann

[11] 4,291,435
[45] Sep. 29, 1981

[54] METHOD OF PROCESSING FISH

[75] Inventor: Franz Hartmann, Oldesloe, Fed. Rep. of Germany

[73] Assignee: Nordischer Maschinenbau Rud. Baader GmbH & Co. KG, Lübeck, Fed. Rep. of Germany

[21] Appl. No.: 92,693

[22] Filed: Nov. 9, 1979

[51] Int. Cl.³ ............................................. A22C 25/14
[52] U.S. Cl. ........................................... 17/45; 17/54; 17/52
[58] Field of Search .......................... 17/54, 53, 45, 52

[56] References Cited

U.S. PATENT DOCUMENTS 2,893,052  7/1959  Schlichting .............................. 17/54
4,025,988  5/1977  Hartmann et al. .................. 17/54 X

FOREIGN PATENT DOCUMENTS 2510421  9/1976  Fed. Rep. of Germany .......... 17/54
512751   5/1976  U.S.S.R. .................................... 17/54
659123   4/1979  U.S.S.R. .................................... 17/54

Primary Examiner—Willie G. Abercrombie
Attorney, Agent, or Firm—Edward F. Levy

[57] ABSTRACT

A method of processing fish in a machine is disclosed, which method enables the control of the time of application and of the control paths of setting members for the tools and guides of the machine and a simple structure of the latter. This controlling is useful and broadly adaptable for timed fish processing machines as well as for such operating non-timed. A measuring device determines a quantity or value to be measured in the form of travel units by the counting of pulses for each fish to be processed, this measured value being proportional to the size of the respective fish, being fed into a computer as the total sum value of the sequence of pulses, and causing a control device to start counting the pulses in turn. The computer determines control data taking into account fish and machine data stored therein, said control data being decisive for the starting times of the single setting members of the tools and their characteristics of movement. The tools become active by activation of the setting members when a starting time value associated to each processing tool and guide corresponds to the position or state of counting reached in the control device.

6 Claims, 1 Drawing Figure

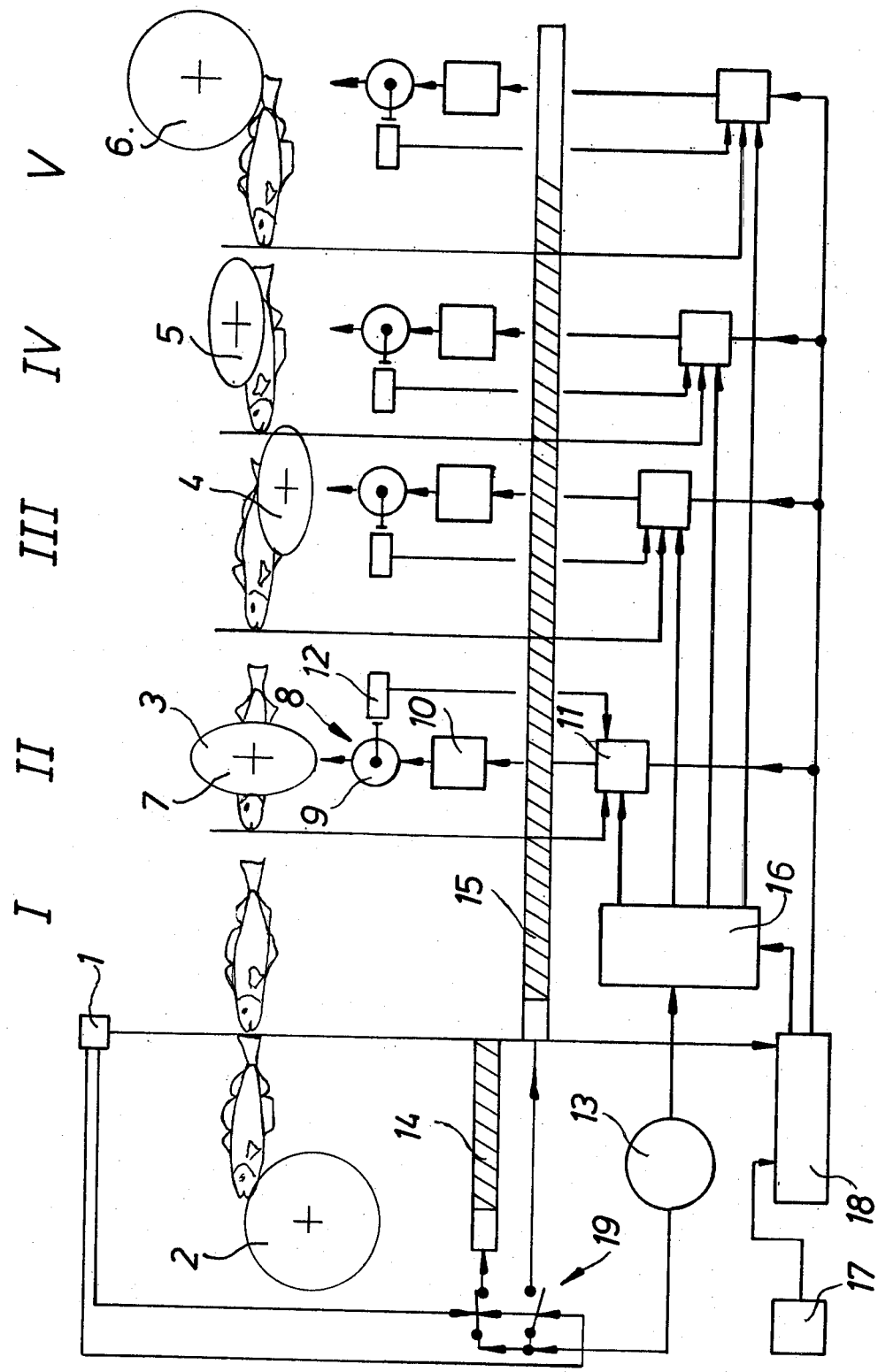

METHOD OF PROCESSING FISH

BACKGROUND OF THE INVENTION

1. Field of the Invention

The present invention relates to a method of controlling the setting members for the time of application and the control travel of tools and/or guides arranged along a conveying path of a fish in a fish processing machine, wherein a quantity or value to be measured, e.g. a number of travel units corresponding to the fish size is determined by measurement of each fish at a measuring location situated in the fish passage, the application value of each setting member is derived from a fish value proportional to the measured quantity of the fish to be processed and a position value corresponding to the spacing of the tool to be actuated from the measuring location, and the deflection value which is proportional to the measured quantity is stored before its utilisation for the control of the setting member.

2. Prior Art

Already known through DE-PS No. 943 612 is a filleting machine for fish with tail clamps moved along a conveying path and conveying the fish, a feeler arranged at the start of the conveying path and determining the rump length of the fish as a quantity to be measured or measurement magnitude, rotatably drivable tooth couplings for the storage of the measurement magnitude of a fish value required for a tool and control cams drivable by the tooth couplings for the respective travels of the setting members actuating the tools or guides. This filleting machine has the disadvantages that a substantial increase in its operating rhythm during the processing of smaller fish is not possible in consequence of the rhythm given by the tail clamps and that its tooth couplings must always return into their starting position. Beyond that, a change of the control travels may only be attained through an alteration or an exchange of the control cams.

Already known through DE-PS No. 1 063 784 is a method of controlling the tools and guides of a fish processing machine, in which the control processes according to their application time values and their displacement values take place separately, because each fish, by a part of its body, for example its preceding end, determines the application time value of a tool or a guide, while the displacement values for all tools and guides are derived through the measurement of a value characterising the fish size. Although it is possible thereby to provide a fish processing machine with a substantially higher operating cycle and without a rigid loading rhythm, a change of the characteristics of the control paths is only possible through alteration or exchange of the control cams.

Furthermore known through DD-PS No. 87 139 is an apparatus for the control of the tools and guides of fish processing machines, in which a series of feeler elements for the determination of the size of the fish is arranged at the start of a conveying path and an additional feeler element, a pulse-shaping stage and a storage device are allocated to each tool or each guide and controlled by a logic circuit associated with the feeler elements at the start of the travel. Although this equipment makes it possible to control the application time values for a plurality of tools and guides sequentially arranged through displacement of the measurement magnitude between the storage devices, it does, however, require an appreciable number of feeler elements and storage devices and cannot influence each tool or each guide in accordance with a specific displacement value.

Also known through DE-OS No. 27 47 386 is an automatic fish processing machine which has a measuring equipment for the determination of a measurement value, a storage device for the storing of data in several groups as well as a computer for the control of process equipment of the fish processing machine. This machine operates with thrust saddles arranged at fixed spacings one from another for the reception of the fish in their abdominal cavities, in dependence on the respective position of which the application time values for each tool are controlled which entails similar disadvantages to those described in connection with DE-PS No. 943 612.

OBJECTS OF THE INVENTION

It is one of the main objects of the present invention to provide a method for controlling the setting members of fish processing machines, this method enabling a simple construction of such machines and necessitating only a limited number of measuring and control elements.

It is another object of the invention to provide such a controlling method suited for fish processing machines working on a timing basis of absolutely non-timed, i.e. without predetermined timing.

A further object of the invention is to guarantee an accurate and exact maintenance of the application time values and of the displacement time values.

It is still another object of the present invention to enable an individual influence on the temporal course of the magnitude of the displacement values for each setting member.

BRIEF SUMMARY OF THE INVENTION

To achieve these objects according to the present invention there is provided a method of processing fish in a fish processing machine, by controlling setting members and control paths of tools and guides arranged sequentially along the conveying path of the fish in said machine, a quantity to be measured or magnitude value corresponding to the size of a fish being determined by measuring each fish at a measuring location lying in the region of the fish conveying path, an application value for each setting member being derived from a fish value proportional to the measured value of the fish to be processed, and from a position value corresponding to the distance between the tool to be actuated and the measuring location, and a displacement value proportional to the measured value being stored before being used for controlling the respective setting member, the method comprising the steps of (a) using position values of each tool, measured by way of travel units of the fish along its conveying path and stored in permanent storage means, and fixedly programmed proportionality factors for the fish value and for the displacement value;

(b) measuring the measured value in travel units of the fish and storing it in erasable storage means;

(c) effecting a starting pulse to be received by control device means and measuring means when one of the ends of said fish passes by said measuring location;

(d) said control device means thereupon effecting the computing of said displacement value and said application value for each tool and their storage as well as the comparison of said measured value, increasing in said measuring device means with said stored application values; and (e) said control device means causing the delivery of an application value to the setting member of the respective tool when the measured value equals said application value.

The advantages achieved thereby essentially are as follows: The application values and displacement values may be maintained independently of the selected conveying speed of the fish due to the utilisation of the travel units of the fish for determining the position values of the tools as well as for the measured value or measurement magnitude. A simple construction with a low number of measuring and control elements is therefore made possible through the utilisation of only one measuring and control location for the initiation of the control mechanism and of the measuring mechanism. Furthermore, a hitherto unattainable accuracy in the temporal maintenance of the application of the setting members is made possible by the continuous comparison of the measurement magnitude with the stored application values.

Preferably said displacement value may be changed following the respective application pulse of a tool according to a stored program, which may be caused to read out by said control device means. Thereby it is rendered possible to adapt the temporal course of the magnitude of the displacement values to an optimum cutting course enabling an optimum yield of fish flesh.

In order to cope with the demand for a simple construction and a small number of elements there may advantageously be provided the steps of storing information and deriving values by means of at least one microcomputer.

With preference, there may be used as travel unit a determined number of pulses counted for one meter of the travel path of said fish. This enables to achieve any desired accuracy in the maintenance of the application values and the control values as well as any desired speed in changing the temporal course of the displacement values.

In order to enable a particularly simple construction in this connection, there are used as travel unit a determined number of pulses delivered from a timing generator associated to one of said measuring means and said control device means.

Advantageously the tools may be controlled by setting members comprising stepping motors each of which having at least one control device. Thereby, the determined application and control values may be transferred to the tools at high accuracy and in a temporarily constant manner.

BRIEF DESCRIPTION OF THE DRAWING

Other and further objects of the present invention will be apparent from the following description and claims and are illustrated in the accompanying drawing, which, by way of illustration shows a preferred embodiment of the present invention and the principles thereof and what now is considered to be the best mode contemplated for applying these principles. Other embodiments of the invention embodying the same or equivalent principles may be used and structural changes may be made as desired by those skilled in the art without departing from the present invention and the scope of the appended claims.

In the schematic drawing, the single FIGURE shows the sequence of processing tools along the path of motion of a fish processing machine, and an associated block schematic diagram of its control circuit.

DETAILED DESCRIPTION OF THE PREFERRED EMBODIMENTS

The drawing shows as an example a filleting machine comprising a pair of belly filleting knives 2 arranged below the path of motion of the fish and upstream of a measuring location I which comprises a measuring feeler 1. A pair of decapitating knives 3 are arranged in a second processing station II, a pair of rib knives 4 in a third processing station III, a pair of flesh bone knives 5 in a fourth processing station IV and a pair of back filleting knives 6 in a fifth processing station V. As exemplified in connection with the second processing station II, a setting member 8 is allocated to each processing tool—in general designated by 7—and comprises a stepping motor 9 with an output part 10, a control device 11, and a proximity switch 12 allocated to the stepping motor 9.

A timing generator 13, which is connectible with a measuring mechanism 14 and a control mechanism 15 and connected with a data distributor 16, is allocated to a known per se conveyor (not illustrated) for the fish. A computer 18 provided with a fish data input 17 is connected with the measuring feeler 1, the measuring mechanism 14, the control mechanism 15, the data distributor 16, and the control devices 11 of the various stations. A switching equipment 19 is arranged between the measuring feeler 1, the measuring mechanism 14, the control mechanism 15, and the timing generator 13. In the following, the function scheme of the circuit arrangement for performing the method according to the invention will be described in greater detail:

When a fish to be processed reaches the measuring location I, the measuring feeler 1 delivers, on the passage of the tail end of the fish, a switching signal which through actuation of the switching device 19 causes an inflow into the measuring mechanism 14 of a number of counting pulses from the timing generator 13 in correspondence with the length of the fish. On the passage of the head end of the fish, the measuring feeler 1 delivers a further switching signal, which on the one hand terminates the inflow of counting pulses into the measuring mechanism 14 and on the other hand causes the control mechanism 15 to count the pulses delivered by the timing generator 13. The sum value of the counting pulses of the timing generator 13, which have passed into the measuring mechanism 14 during the passage of the fish past the measuring feeler 1, is transferred to the computer 18. Fish data specific to the kind of fish to be processed and concerning anatomical proportions, have been put into the computer 18 through the fish data input 17, and machine data are also stored in the computer 18, such as for example the spacing of the different processing tools from the measuring feeler 1. The sum value fed to the computer 18 for the fish length of the fish to be processed is processed into control data using the stored fish data and machine data, these control data being passed to the data distributor 16. By reason of these control data, the data distributor 16 synchronised with the timing generator 13 is able to deliver the starting times for the processing tools 7—resp. the knives 3, 4, 5 and 6, with regard to the shown example—to the control device 11 of the respective setting members of the respective one of stations II through V. The starting time value determined by reason of the control data is compared in the data distributor 16 with the sum of the counting pulses which have passed into the data distributor 16 from the timing generator 13. On agreement of the starting time value and the sum, the output part 10 of the setting member 8 is actuated and at the same time the run-down of the program stored in the control device 11 is initiated to control the course of motion of the setting member 8 and the duration of its actuation. The run-down of the program of the motion of the setting member 8 is performed by reason of the data determined by the computer 18 by means of mathematical functions with consideration of the characteristics of the stepping motor 19 in terms of output and mode of construction, the inertias of the setting member 8 and the parts to be driven of the processing tool 7, as well as with adaptation to the anatomy of the fish to be processed. In that case, the control device 11 controls the stepping motor by means of individual pulses, the time sequence, number, and duration of which are predetermined by the program of the computer 18. The pulses are fed through the output part 10 of the stepping motor 19 in the shape of stepping pulses controlling the same. The proximity switch 12 allocated to the stepping motor 9 assures an unambiguous ground position of the respective processing tool 7 after the return thereof.

What is claimed is:

1. A method of processing fish in a fish processing machine, by controlling setting members and control paths of tools and guides arranged sequentially along the conveying path of the fish in said machine, a quantity to be measured or magnitude value corresponding to the size of a fish being determined by measuring each fish at a single measuring location lying in the region of the fish conveying path and upstream of the first tool to be controlled, an application value for each setting member being derived from a fish value proportional to the measured value of the fish to be processed, and from a position value corresponding to the distance between the tool to be actuated and the measuring location, and a displacement value proportional to the measured value being stored before being used for controlling the respective setting member, the method comprising the steps of (a) using position values of each tool, measured by way of travel units of the fish along its conveying path and stored in permanent storage means, and fixedly programmed proportionality factors for the fish value and for the displacement value;
(b) measuring the measured value in travel units of the fish and storing it in erasable storage means;
(c) effecting a starting pulse to be received by control device means and measuring device means when one of the ends of said fish passes by said measuring location;
(d) said control device means thereupon effecting the computing of said displacement value and said application value for each tool and their storage as well as the comparison of a sum of counting pulses with said stored application values, said sum of counting pulses increasing in the control device means; and
(e) said control device means causing the delivery of an application value to the setting member of the respective tool when the sum of counting pulses equals said application value.

2. A method according to claim 1, comprising the step of changing said displacement value following the respective application pulse of a tool according to a stored program, which may be caused to read out by said control device means.

3. A method according to claim 1 or 2, comprising the steps of storing information and deriving values by means of at least one microcomputer.

4. A method according to claim 1, comprising the step of using as travel unit a determined number of pulses counted for one meter of the travel path of said fish.

5. A method according to claim 1, comprising the step of using as travel unit a determined number of pulses delivered from a timing generator associated to one of said measuring device means and said control device means.

6. A method according to claim 1, comprising the step of controlling the tools by setting members comprising stepping motors each of which having at least one control device.

* * * * *